United States Patent [19]

Wiebe

[11] Patent Number: 4,980,962

[45] Date of Patent: Jan. 1, 1991

[54] APPARATUS FOR APPLYING TERMINALS TO ELECTRICAL CONDUCTORS

[75] Inventor: Ulrich Wiebe, Dörentrup, Fed. Rep. of Germany

[73] Assignee: C.A. Weidmuller GmbH & Co., Fed. Rep. of Germany

[21] Appl. No.: 495,111

[22] Filed: Mar. 19, 1990

[30] Foreign Application Priority Data

Mar. 31, 1989 [SE] Sweden ............................... 8901128

[51] Int. Cl.$^5$ .......................... B23P 23/00; B21D 7/06

[52] U.S. Cl. ...................................... 29/566.2; 29/751; 72/410

[58] Field of Search ................ 29/33 M, 566.1, 566.2, 29/566.3, 566.4, 564.6, 750, 751, 753, 759, 752; 72/410, 409, 421

[56] References Cited

U.S. PATENT DOCUMENTS

| | | | |
|---|---|---|---|
| 3,184,950 | 5/1965 | Sitz | 29/753 |
| 3,393,438 | 7/1968 | Marley et al. | 29/751 X |
| 3,710,610 | 1/1973 | McCaughey | 72/410 |
| 4,534,107 | 8/1985 | Maack | 29/751 |
| 4,612,794 | 9/1986 | Schmidt | 29/751 X |
| 4,928,822 | 5/1990 | Geisser | 29/751 |

FOREIGN PATENT DOCUMENTS

| | | | |
|---|---|---|---|
| 623909 | 7/1961 | Canada | 29/33 M |
| 2018901 | 4/1979 | Fed. Rep. of Germany | 29/751 |

*Primary Examiner*—William Briggs

*Attorney, Agent, or Firm*—Cushman, Darby & Cushman

[57] ABSTRACT

An apparatus for applying by crimping terminals, which are provided in an elongated terminals strip, to electrical conductors, comprises a tool body and two jaw means which carry co-operating crimping dies, and of which at least one jaw means is movable relative to the body. To the tool body is an elongated carrier arm pivoted which projects beyond the jaw means, and to the free end of the carrier arm is a supply board pivoted which extends rearwardly toward the jaw means and carries a manually operated feeder device with a transport roller for the terminals strip. Between the feeder device and the jaw means is a cutting station for the terminals strip located which comprises at least one pair of co-operating cutting edges and is drivable by the closing movement of one of the jaw means.

14 Claims, 3 Drawing Sheets

APPARATUS FOR APPLYING TERMINALS TO ELECTRICAL CONDUCTORS

BACKGROUND OF THE INVENTION

The present invention refers to an apparatus or a tool for applying terminals, such as plug connectors and the like, to electrical conductors, by affixing through crimping. It has been already known to use, instead of individual terminals, continuous stripes comprising a plurality of terminals which first in connection with the crimping operation are individually separated from the strip.

OBJECT OF THE INVENTION

It is an object of the present invention to provide a novel and compactly built tool for affixing to an electrical connector terminals supplied in a strip.

SUMMARY OF THE INVENTION

This object and others which will become apparent hereinafter are attained with an apparatus which comprises in combination: an apparatus body; a first jaw means which has a free end, is associated with the apparatus body, and carries at said free end a first crimping die; a second jaw means which is in a closing motion movable toward the first jaw means, has a free end, and carries at that free end a second crimping die having two lateral faces and defining together with the first crimping die a crimping station; a first pivot means for pivotally connecting the two jaw means one with another; a driving means to drive the second jaw means in said closing motion and in a reverse opening motion; an elongated carrier arm extending along the jaw means as far as beyond their free ends and having a first end, at which it is pivotally attached to the apparatus body, and a free second end which is located beyond the free ends of the jaw means; a supply board which has a forward end and a rear end and is pivotally attached, at said forward end, by a second pivot pin means to the free end of the carrier arm, and which further has an upper surface, extending along the carrier arm, and terminating at the rear end ahead of the free ends of the two jaw means; stop means limiting the pivotal movement of the supply board relative to the carrier arm; a manually operable feeder device, mounted on the supply board, for feeding the terminals strip to the crimping station; and a cutting station, located between the feeder device and the crimping station and comprising two cooperating cutting knife means which have cutting edges extending transversely to the longitudinal direction of the terminals strip and which are approachable one to another in an operative motion, at least one of said cutting knife means being drivable in the said operative motion by the second jaw means performing its closing motion, so that the terminals strip is automatically cut in connection with each crimping operation.

BRIEF DESCRIPTION OF THE DRAWINGS

The invention shall now be explained in greater detail with the aid of the annexed drawings, in which.

DETAILED DESCRIPTION OF THE INVENTION

Figure 5:
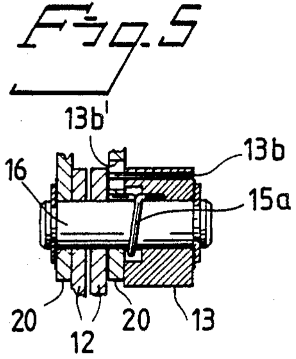
FIG. 5 is a partial sectional view along the plane V—V in FIG. 1 of a slightly modified embodiment.

The apparatus according to the invention has the general shape of a conventional pair of crimping pliers with a pair of jaw means 11, 12 and a pair of handles 21, 22 defining a driving means. The first jaw means 11 is rigidly connected to the first handle 21 and defines therewith an apparatus body 20. The movable second jaw means 12 is pivoted to the apparatus body 20, and consequently also to the first jaw means means 11, with the aid of a first pivot pin means which can be embodied either by a conventional pivot pin 16, as shown in FIG. 5, or by one leg 15' of a U- or yoke-shaped holder 15, to be described in detail later.

The two jaw means 11, 12 carry in a conventional, and preferably exchangeable, manner crimping dies 11 ta, **12*a* which together define a crimping station in which, in the exemplary embodiment shown in the drawings, the upper die 11*a* is a retracted die, and the lower die 12*a*** is a projecting one. So far, the construction is conventional.

Figure 2:
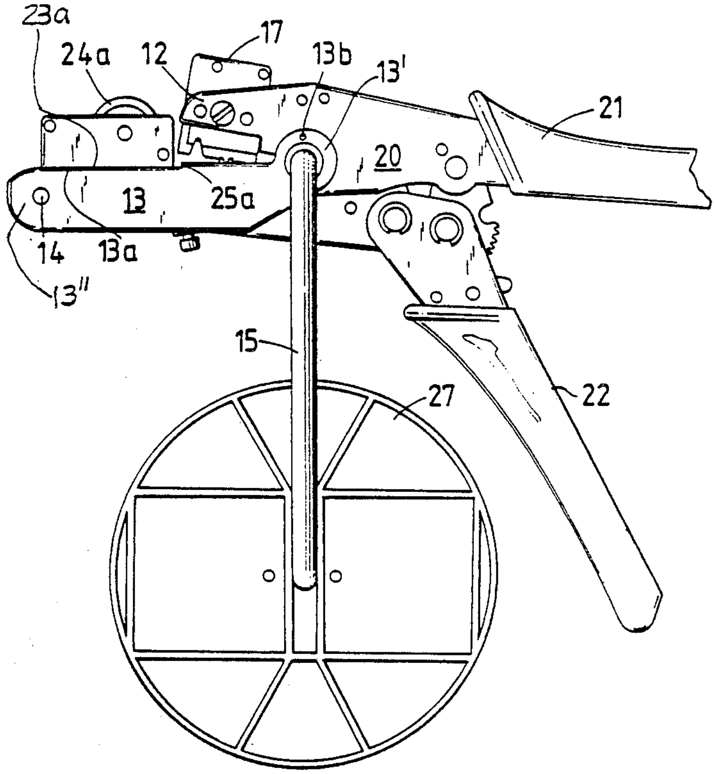
FIG. 2 is a second side elevational view, on a smaller scale than FIG. 1, and from the opposite side, of the same apparatus.
Figure 3:
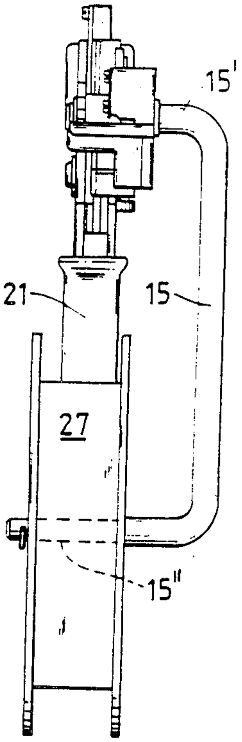
FIG. 3 is a rear view of the apparatus of FIGS. 1 and 2.
Figure 4:
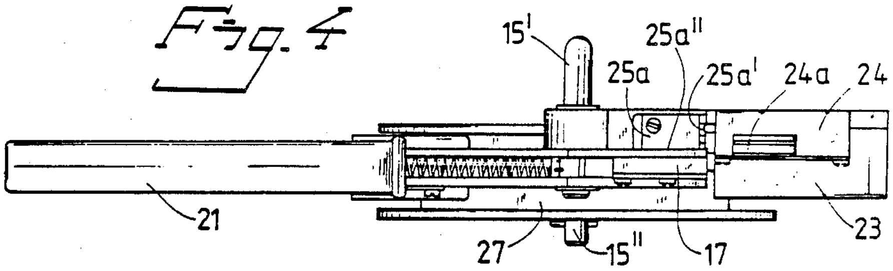
FIG. 4 a top view of the apparatus of FIGS. 1 and 2.

According to the present invention, an elongated carrier arm 13, extending along the jaw means 11, 12 and beyond their free front ends 11', 12', is at its first end 13' (FIG. 2) pivotally attached to the apparatus body 20 with the aid of the first pivot pin means 15' or 16. An also longitudinal, but shorter supply board 23 is at its forward end with the aid of a second pivot pin means 14 pivotally attached to the second, free end 13' of the carrier arm 13, and extends rearwardly along the the carrier arm 13 to the free ends 11', 12' of the jaw means 11, 12, terminating there with a rear end 23'.

Figure 8:
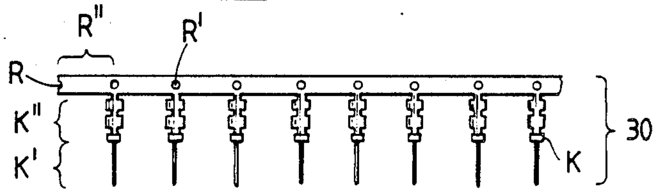
FIG. 8 shows a strip of plug terminals to be treated in the apparatus according to the invention.

The supply board 23 carries a feeder device 24 for feeding a terminals strip 26 (FIG. 8) with terminals K to the crimping station **11*a*, 12*a*. The feeder device 24 is mounted on the supply board 23 in such a way that on one side thereof extends along the entire length of the device—an elongated, low slot S above the upper surface 23" of the supply board 23**.

The feeder device 24 comprises a freely rotable transport or feeder roller **24*a* which at the uppermost part 24*a*' of its circular periphery, projecting from the feeder device 24, may by driven by the finger of one hand. The transport roller 24*a* touches with the lowermost part of its said periphery the upper surface 23" of the supply table 23** within the slot S.

The transport roller **24*a* is at its circumference preferably covered by a friction ring 24*b*, which is to a limited degree resilient, being made e.g. of rubber or the like, so that the transport roller 24 in such a case bears against the upper surface 23" by this ring 24*b*. Alternatively, the periphery of the transport roller 24** may be fluted or the like.

The terminals strip 30 (FIG. 8), which has been produced in manner known per se lying beyond the scope of the present invention, comprises an edge stripe R with manipulating openings R' (originating from the production stage), and a plurality of individual terminals K. Each terminal K has a contact portion K' and an affixing portion (or crimping barrel) K". In the affixing portion shall the stripped end of an electrical conductor be introduced in order to be affixed there by crimping. The individual terminals K are connected to the edge stripe R' on a single location, beyond the affixing portion K". The said slot S has a a thickness as to allow introduction of the edge stripe R' therein.

Figure 1:
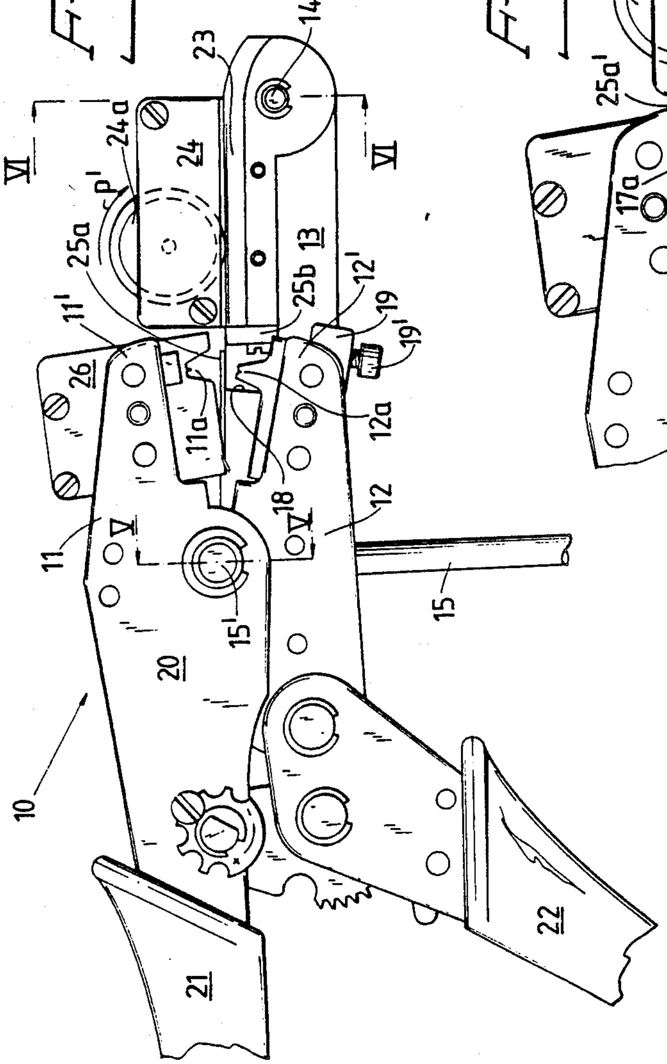
FIG. 1 is a first side elevational view of the front part of an apparatus according to the invention.
Figure 6:
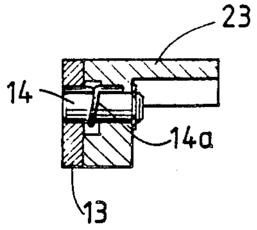
FIG. 6 is a partial sectional view along the plane VI—VI in FIG. 1.

As well the first pivot pin means 15' or 16, as the second pivot pin means 14 are according to FIGS. 5 and 6 mounted with the aid of return means 14a, 15a embodied by at least one spring loop, so that as well carrier arm 13 (when swung out relative the first jaw means 11 and the apparatus body 20), as the supply board 23 (when swung out relative to the carrier arm 13) are automatically returned into their respective intial positions which are shown in FIG. 1.

These initial or rest positions are defined by pairs of co-operating stop means. In the instance of the carrier arm 13 are these means embodied by a small plate 25a, which below will be described more in detail, which abuts against the edge of the upper crimping die 11a (limitation of an upward movement), and (limitation of a downward movement, i.e. definition of the initial position) by a cylindrical pin 13b (FIG. 5) which is provided in the carrier arm 13 near the first pivot pin means 15' or 16, and which may travel in a slot 13' in the aparatus body 20 and abut with the end of this slot.

In the instance of the supply board 23 are the stop means embodied by mutually adjacent edges 13a (FIG. 2) of the carrier arm 13 and 24a of a laterally projecting part of the feeder device 24.

Another pair of co-operating stop means defines the maximally swung-out position of the supply board 23 relative to the carrier arm 13, and is embodied by the head 23a' (FIG. 1) of a screw 23a which is screwed-in in the supply board 23, and an edge 25a ' of a plate-shaped knife 25a, to be described more in detail below, which is affixed to the carrier arm 13.

On the free end 12' of the movable second jaw means 12 is a set screw 19 mounted so as to define a carrier member for the supply board 23. When the second jaw means 12 executes a closing motion in the sense of arrow P (FIG. 1a), the set screw 19 engages the adjacent end 23' of the supply board 23, or, more correctly, a knife 25b which is firmly mounted there and which will be described more in detail below.

Thereby is the supply board 23 pivoted upwardly about the second pivot pin means 14, till the said stop means 23a and 25a' engage one with another.

From FIG. 5 is also evident that the apparatus body 20 and the jaw means 12 may preferably, and in conventional manner, be defined by pairs of spaced apart side plates.

Between the feeder device 24 and the crimping station 11a, 12a is a pair of co-operating cutting knife means provided which constitute a cutting station for cutting-off the terminals strip 30, and which are embodied by the above mentioned knives 25a and 25b. Knife 25a is defined by a small plate mounted on the carrier arm 13, and knife 25b is embodied by a small block affixed to the supply board 23 by the already mentioned screw 23a. A free part of the lower surface 25aa of the small plate 25a is located at, or insignificantly above, the level of the upper surface 23" of the supply board 23.

The adjacent edges of the small plate 25a and of the small block 25b are shaped so as to define cutting edges 25a' and 25b', whereas the edge 25a' of the knife 25a at the same time serves as the above mentioned stop means.

Figure 7:
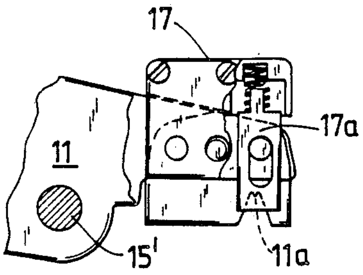
FIG. 7 shows on a larger scale a detail from FIG. 1.

A stop and retainer means 17 according to FIG. 7, mounted on the first jaw means 11 adjacent the crimping die 11a, and comprising a spring-affected slide 17a as retainer member, is provided for positioning the conductor (not shown) in the terminal K, and in particular to secure it against rotation, as well as to fill the function of an ejector for removing the crimped terminal from the respective die. Simultaneously, retainer/ejector means 17 prevents the conductor to be too deeply introduced into the terminal.

The first pivot pin means is according to FIGS. 1 to 4 embodied by one leg 15' of a yoke- or U-shaped holder 15, which has, spacedly from the leg 15', another leg 15". Leg 15" carries a supply reel 27 for a wound-up supply (not shown) of the terminals strip 30 which at E is fed into the feeder device 24. However, it will be realized that the apparatus according to invention may of course also be used for limited lenths of the terminals strip, not wound up on a reel, so that the supply reel 27 is by no means an absolute necessity, and the first pivot pin means may be embodied by a simple pin 16 as shown in FIG. 5.

The apparatus operates as follows:

The strip 30, irrespective if it comes from a wound-up supply, or from a not wound-up length, is on the supply board 23 by its edge stripe R at E introduced into the slot S between the house of the feeder device 24 and the upper surface 23" of the supply board 23, and is pushed under the transport roller 24a. Then it is fed forward to the crimping station 11a, 11b by the transport or feeder roller 24a being rotated by a finger of one hand on its projecting upper part 24a' in the sense of the arrow P'.

The forward feed can, however, continue only till the edge stripe R gets under the little plate 25a and there abuts with a stationary stop 18 which is placed so, that the first terminal K on the strip 30 is exactly located in the crimping station 11a, 12a when said abutment takes place. A stripped end of a conductor is then introduced into the affixing part K" of this terminal K.

By operating the handle 22, the second jaw 12 is in a closing motion approached to the first jaw 11, and the terminal K, stabilized by the spring-loaded retainer member 17a, is in conventional manner crimped on the conductor. At the same time, however, an end piece R" of the edge stripe R, appertaining to the respective terminal K, is separated from the edge stripe R, and the terminal K itself is separated from the end piece.

This occurs in the following manner. When the second jaw 12 is lifted, the supply board 23 is by the set screw 19 pivoted upwardly about the second pivot means 14, and hereat is the edge stripe R, whose end piece R" is located under the little plate 25, cut through by the co-operating cutting knife means 25a, carrying the knife edge 25a' which extends transeversely to the longitudinal direction of the strip 30, and 25b, which carries the knife edge 24b', also extending transversely to the longitudinal direction of the strip 30.

The cutting knife means 25b executes thus, due to the closing motion of the second jaw means 12, an operative motion toward the cutting knife means 25a.

Figure 1A:
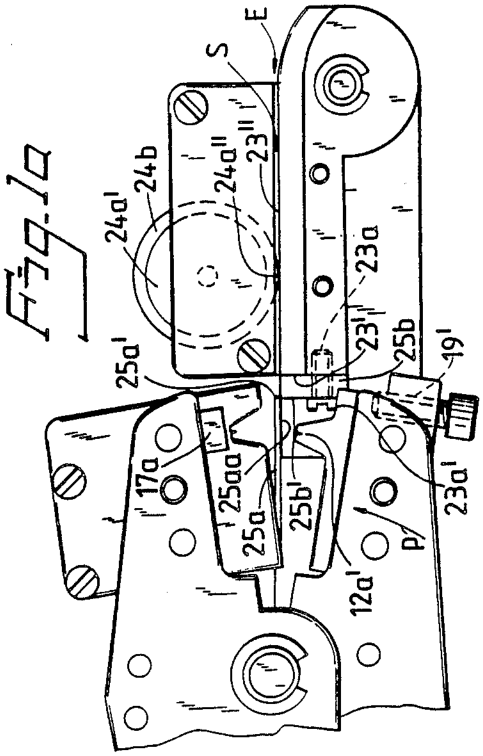
FIG. 1*a* shows the right hand part of FIG. 1 on a larger scale.

It will be observed that the end 19' of set screw 19 lies, in the rest position shown in FIG. 1a, a bit under the knife block 25b, which means that the jaw 12 must first cover a part of its closing movement, before engagement between the set screw 19 and the supply board 23 takes place. By adjusting the set screw 19, the moment or, more correctly, the phase, at which said engagement occurs, may be exactly set, and thus may also be selected the mutual position which the two knife edges 25a' and 25b' shall then occupy.

The terminal K is separated from the end edge stripe R by two co-operating cutting edges which extend in the logitudinal direction of the strip 30 and which are embodied by an edge 25a' (FIG. 4) of the small plate 25a, extending in said direction, and the upper edge of that side face of the crimping die 12a in the second jaw 12 which is adjacent said small plate 25a. This upper edge is identical with, and in the drawing hidden by, the upper edge 12a' (FIG. 1a) of the lateral face of the die 12 which is remote from the small plate 25a.

The separation of the terminal K from the end piece R" of the stripe R occurs when the crimping die 12a passes, due to the closing movement of the second jaw 12, from below upwardly, past the edge 25a'.

The separated end piece R" of the edge stripe R constitutes refuse which falls out of the apparatus. When the second jaw 12 has returned to the initial position, a new feeding and crimping operation can take place.

It will be appreciated that the apparatus according to the present invention also may be embodied by a stationary device in which the second jaw means 12 is driven e.g. by an electrical or pneumatical motor.

What is claimed is:

1. An apparatus for affixing to electrical conductors terminals which are provided in the form of terminals strips which comprise a continuous edge stripe and a plurality of individual terminals, said apparatus comprising, in combination:

- an apparatus body;
- a first jaw means which has a free end, is associated with the apparatus body, and carries at said free end a first crimping die;
- a second jaw means which is in a closing motion movable toward the first jaw means, has a free end, and carries at that free end a second crimping die having two lateral faces and defining together with the first crimping die a crimping station;
- a first pivot means for pivotally connecting the two jaw means one with another;
- a driving means to drive the second jaw means in said closing motion and in a reverse opening motion;
- an elongated carrier arm extending along the jaw means as far as beyond their free ends and having a first end, at which it is pivotally attached to the apparatus body, and a free second end which is located beyond the free ends of the jaw means;
- a supply board which has a forward end and a rear end and is pivotally attached, at said forward end, by a second pivot pin means to the free end of the carrier arm, and which further has an upper surface, extending along the carrier arm, and terminating at the rear end ahead of the free ends of the two jaw means;
- stop means limiting the pivotal movement of the supply board relative to the carrier arm;

- a manually operable feeder device, mounted on the supply board, for feeding the terminals strip to the crimping station; and
- a cutting station, located between the feeder device and the crimping station and comprising two co-operating cutting knife means which have cutting edges extending transversely to the longitudinal direction of the terminals strip and which are approachable one to another in an operative motion, at least one of said cutting knife means being drivable in the said operative motion by the second jaw means performing its closing motion, so that the terminals strip is automatically cut in connection with each crimping operation.

2. The apparatus of claim 1, wherein return means are associated with at least one of the first and second pivot pin means in order to return at least one of the members carrier arm and supply board from a swung-out position into its initial position.

3. The apparatus of claim 1, wherein the carrier arm is pivoted to the apparatus body with the aid of the said first pivot pin means.

4. The apparatus of claim 1, wherein the feeder device comprises a manually drivable transport or feeder roller with a circular periphery, and which is mounted so that the edge stripe of the terminals strip may be introduced between the said periphery and the upper surface of the supply board.

5. The apparatus of claim 4, wherein the said periphery is covered with a frictional, and to a limited degree resilient, ring.

6. The apparatus of claim 4, wherein a slot is provided between the upper surface of the supply board and one side of the feeder device so as to enable introduction of the edge stripe of the terminals strip to the said roller.

7. The apparatus of claim 1, wherein a small plate is mounted on the carrier arm in such a way that it has a free part on its under face which is level with the upper face of supply board, and an end stop for the terminals strip forwarded by the feeder device is provided adjacent said free part.

8. The apparatus of claim 1, wherein said cutting edges extending transversely to the longitudinal direction of the terminals strip are defined by a cutting edge provided at the rear end of the cutting board and by a co-operating cutting edge mounted on the carrier arm.

9. The apparatus of claim 7, wherein said cutting edges extending transversely to the longitudinal direction of the terminals strip are defined by a cutting edge provided at the rear end of the cutting board and by a co-operating cutting edge mounted on the carrier arm, and last named cutting edge is defined by an edge of said small plate.

10. The apparatus of claim 1, wherein the cutting station is adapted to separate the terminals from the edge stripe of the terminals strip by further being provided with two co-operating cutting edges extending parallel with the longitudinal direction of the terminals strip.

11. The apparatus of claim 7, wherein the cutting station is adapted to separate the terminals from the edge stripe of the terminals strip by being provided with two co-operating cutting edges extending parallel with the longitudinal direction of the terminals strip and defined by an edge of the said small plate, extending in said direction, and by an adjacent upper edge of a lateral face of the crimping die mounted at the second jaw means.

12. The apparatus of claim 1, wherein a movable, spring-loaded retainer means for stabilizing the terminal which is being crimped is mounted adjacent the crimping die mounted in the first jaw means.

13. The apparatus of claim 1, wherein a movable, spring-loaded ejector means for ejecting the crimped terminal from the die is mounted adjacent the crimping die mounted in the first jaw means.

14. The apparatus of claim 1, wherein the first pivot means is embodied by one leg of a U-shaped holder whose spaced apart second leg carries a supply reel for the terminals strip.

* * * * *